US006757364B2

United States Patent
Newkirk

(10) Patent No.: US 6,757,364 B2
(45) Date of Patent: Jun. 29, 2004

(54) VOICE-ACTIVATED TELEPHONE DIRECTORY

(75) Inventor: Darrel Newkirk, Kansas City, KS (US)

(73) Assignee: USA★USA★USA, LLC, Kansas City, KS (US)

(*) Notice: Subject to any disclaimer, the term of this patent is extended or adjusted under 35 U.S.C. 154(b) by 43 days.

(21) Appl. No.: 10/226,655

(22) Filed: Aug. 23, 2002

(65) Prior Publication Data

US 2004/0037400 A1 Feb. 26, 2004

(51) Int. Cl.[7] .............................................. H04M 1/64
(52) U.S. Cl. .............................. 379/88.16; 379/88.03; 379/93.12; 379/218.01
(58) Field of Search .......................... 379/88.01–88.03, 379/88.13, 88.16, 88.17, 88.22–88.28, 93.12, 211.01, 214.01, 218.01, 218.02

(56) References Cited

U.S. PATENT DOCUMENTS 4,757,267 A * 7/1988 Riskin .................. 379/114.24
6,404,877 B1 * 6/2002 Bolduc et al. ......... 379/218.01
6,625,595 B1 * 9/2003 Anderson et al. .............. 707/3

* cited by examiner

Primary Examiner—Roland G. Foster
(74) Attorney, Agent, or Firm—Hovey Williams LLP

(57) ABSTRACT

A method of operating a telecommunications network (10) for providing a voice-activated telephone directory is disclosed. The directory is toll-free to the caller and accessible via a heavily advertised, easily remembered access number wherein the caller is quickly and automatically connected to the selected business. The preferred method broadly includes step (34) of providing a 1-800 access number, step (36) of prompting the caller to speak a spoken business category, step (38) of comparing the category spoken by the caller with a stored database of categories to determine a match, step (40) of prompting the caller to speak the desired business entity listing the caller is seeking if a category match is determined, step (42) comparing the entity spoken by the caller with a stored database of entities to determine a match, step (44) of connecting the caller to a business telephone number associated with the matched business entity if an entity match is determined, and step (46) of charging the business the caller was connected to a fee for making the connection.

13 Claims, 3 Drawing Sheets

VOICE-ACTIVATED TELEPHONE DIRECTORY

BACKGROUND OF THE INVENTION

1. Field of the Invention

Figure 1:
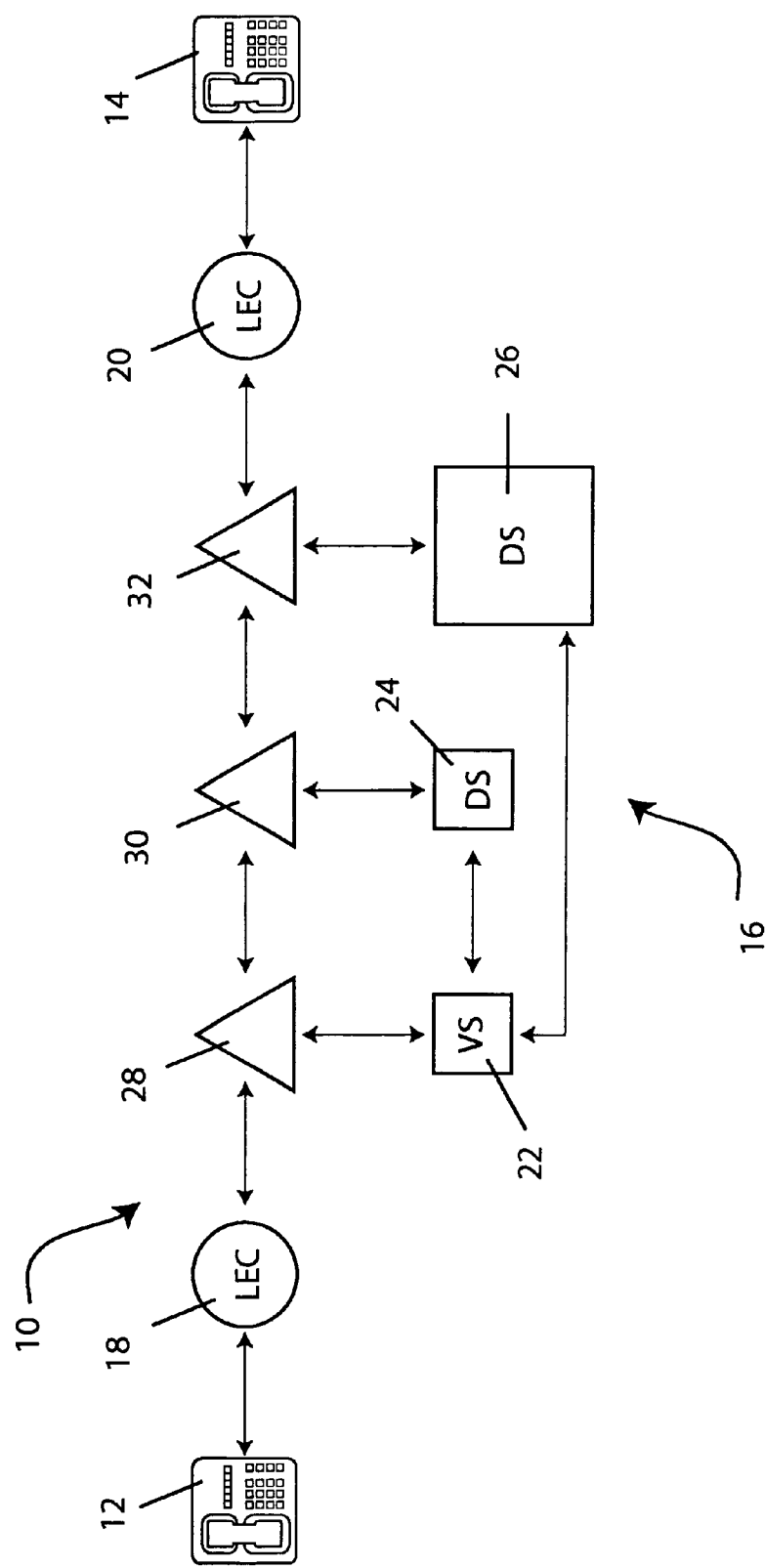

The present invention relates generally to telecommunications. More specifically, the present invention concerns a voice-activated telephone business directory that is toll-free to the caller and accessible via a heavily advertised, easily remembered access number to quickly and automatically connect a caller to a selected business.

2. Discussion of Prior Art

As markets have continued to become more globalized, telecommunications have grown more vital in maintaining channels of communication between remotely located individuals and corporations engaged in business. It is therefore desirable to provide the remotely located individuals with an efficient, easy-to-use, cost-effective system to access and connect to a business's telephone number.

It is known in the art to provide an individual user with a telephone book having a limited number of sorted business listings. These prior book directories, however, are problematic and suffer from several limitations. For example, the book directories are limited in the quantity of numbers they contain and are difficult to update. Furthermore, the individual must have the book accessible in order to find the desired number and once the number is retrieved, the user must physically dial the number, often at the user's expense.

It is known in the art to provide a voice-activated database directory accessible by dialing an access number. These prior art database directories, however, are also problematic and suffer from several limitations. For example, the access numbers are difficult for users to remember and the caller is typically required to pay for using the access number. Additionally, these directories are relatively slow to activate or require the user to register voice templates and/or number listings in advance.

SUMMARY OF THE INVENTION

The present invention provides an improved voice-activated telephone directory that is toll-free to the caller and accessible via a heavily advertised, easily remembered access number to quickly and automatically connect a caller to a selected business.

A first aspect of the present invention concerns a method of operating a telecommunications network for providing a voice-activated telephone directory. The inventive method broadly includes the steps of heavily advertising an easily remembered toll-free telephone number for accessing the network directory, receiving a telephone call over the network from a caller in response to the caller dialing the access number, activating a voice-prompt from a voice server prompting the caller to speak a spoken category, comparing the category spoken by the caller with a stored database of categories to determine a first match, activating a voice-prompt from the voice server prompting the caller to speak a spoken business identity if the first match is determined, comparing the business identity spoken by the caller with a stored subdirectory of business identities grouped to the matched category to determine a second match, connecting the caller to a business telephone number associated with the matched business identity if the second match is determined, charging the business the caller was connected to a fee for making the connection, and connecting the caller to a live operator if the first or second match is not determined.

A second aspect of the present invention concerns a voice-activated telephone directory. The directory broadly includes a first database, a second database, a voice server, and a billing server. The first database includes a plurality of business identities wherein each identity is associated with a business telephone number. The second database includes a plurality of business categories wherein each category is associated with at least a portion of the plurality of business identities. The voice server is activated by a caller dialing a toll-free access number and is operable to receive a first spoken entry from the caller and compare the first entry with the plurality of business categories in the second database to determine a first match. The voice server is operable to prompt the caller to speak a second spoken entry if the first match is determined, receive the second entry, and compare the second entry with the plurality of business identities in the first database to determine a second match. If the second match is determined, the voce server is operable to connect the caller to the business telephone number associated with the business identity matching the second spoken entry. The billing server is operable to tabulate the total connections made by the voice server to each business telephone number associated with each business identity in the first database.

Other aspects and advantages of the present invention will be apparent from the following detailed description of the preferred embodiments and the accompanying drawing figures.

BRIEF DESCRIPTION OF THE DRAWING FIGURES

Figure 2:
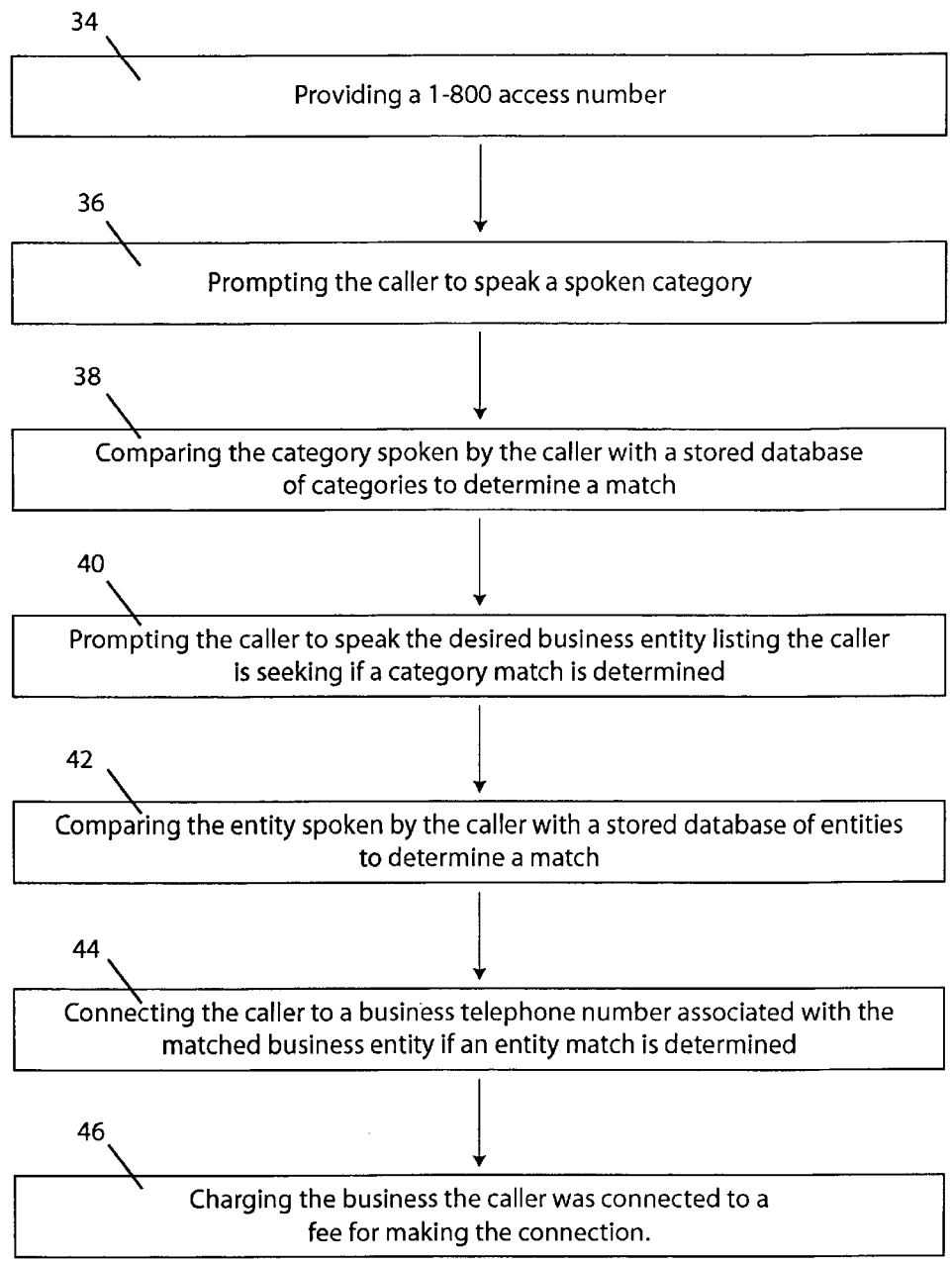
Figure 3:
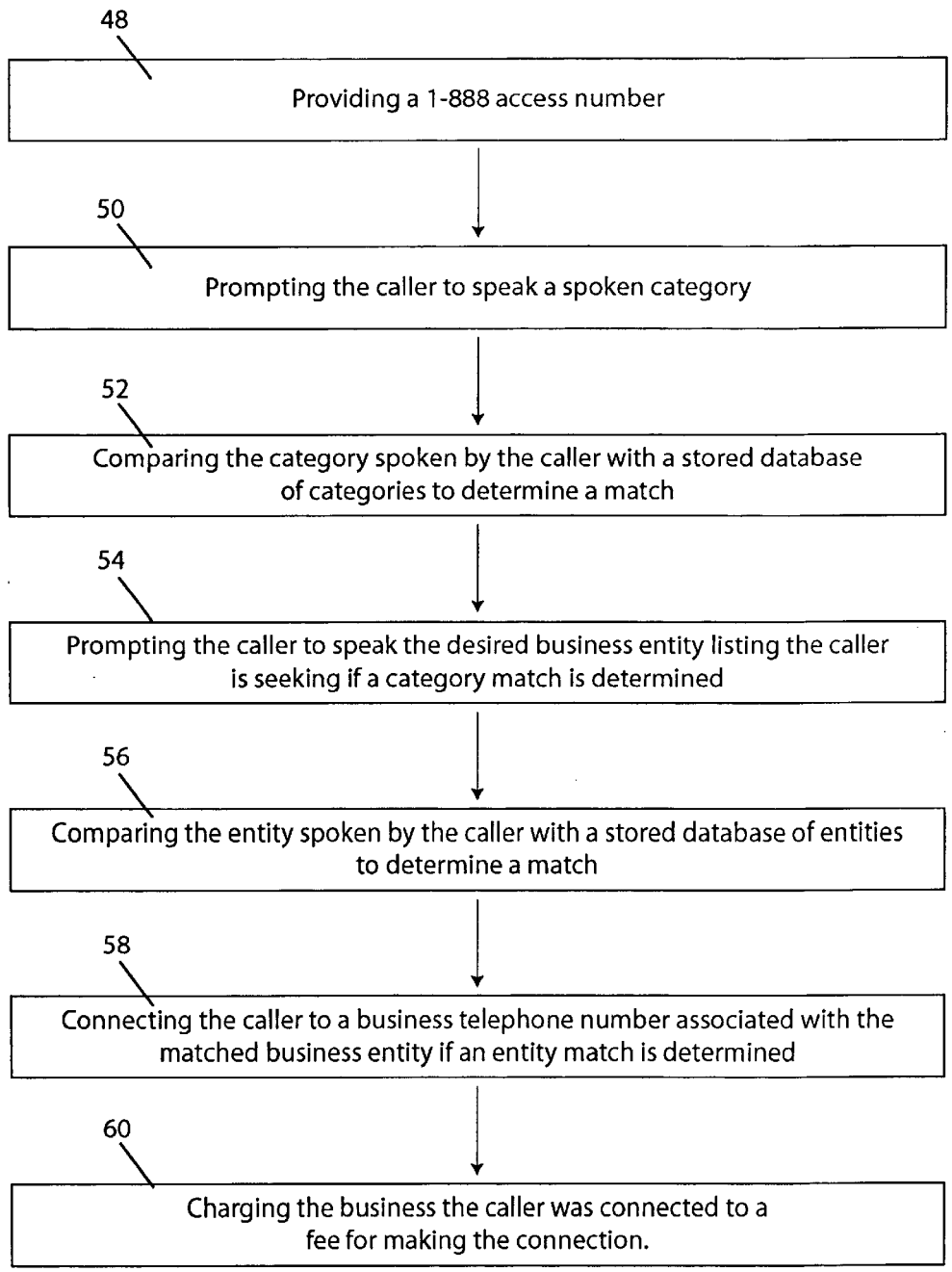

Preferred embodiments of the invention are described in detail below with reference to the attached drawing figures, wherein:

FIG. 1 is a schematic representation of an exemplary telecommunications network that may be used to implement certain aspects of the present invention;

FIG. 2 is a flow diagram illustrating the steps of a method for operating a telecommunications network in accordance with the principles a preferred embodiment of the present invention for providing a voice-activated telephone directory; and FIG. 3 is a flow diagram illustrating the steps of a method for operating a telecommunications network in accordance with the principles of a preferred alternative embodiment of the present invention for providing a voice-activated telephone directory.

DETAILED DESCRIPTION OF THE PREFERRED EMBODIMENTS

Referring initially to FIG. 1, a telecommunications network 10 is illustrated configured to connect call stations 12 and 14 for telecommunications therebetween as will be described in detail below. The illustrated network 10 is a preferred form of a network for operation using the method of the present invention to provide a voice-activated directory in connection therewith. However, it is within the ambit of the present invention to utilize virtually any type of telecommunications network for operation using the steps of the inventive method described herein so long as the network is operable to interconnect a user and at least one business for telecommunications therebetween and as long as the network is compatible with the voice-activated directory provided by the inventive method. The illustrated network 10 broadly includes an interexchange carrier ("IC") network 16 connected to respective local exchange carriers ("LEC") 18 and 20 which are connected to the corresponding calling stations 12 and 14, respectively.

In more detail, in one manner known in the art, the IC network 16 carries long-distance communications traffic including voice and data between the LECs 18 and 20. However, the LECs 18 and 20 may also be local access transport areas. The local telephone companies provide the traditional telephone service (e.g., POTS) to the users at call stations, such as calling stations 12 and 14. In this manner, as described in detail below, a user (e.g., a caller desiring to communicate with another user such as a business remotely located relative to the caller) simply accesses the network 10 via the caller's call station 12 (e.g., a telephone, a personal computer, etc.) and the network 10 connects the caller to the business's call station 14. The illustrated IC network 16 includes a plurality of voice responsive control devices, including a voice server 22, a category database storage 24, and a entity database storage 26, connected to the network by corresponding switches 28, 30, and 32, respectively.

The voice responsive control devices 22,24,26 are generally operable to store retrievable database templates, to receive spoken utterances, to decode and/or recognize selected spoken words independently of the speaker thereof, and to compare the stored utterances with selectively retrieved database templates to determine whether they match. Such devices are well known in the art and are available from a variety of commercial manufacturers including for example Texas Instruments, Inc. of Dallas, Tex. In particular, the voice server 22 is connected to the switch 28 and is operable to handle a plurality of calls. Depending upon the anticipated usage of the voice-activated directory of the present invention, a plurality of voice servers and switches could be implemented. The switch 28 is programmed to respond to the dialing of a toll-free access number (described in detail below) by placing the call station from which the call originated (e.g., the station 12) into communication with the voice server 22 in order to provide the caller with access to the voice-activated directory.

The database storage units 24 and 26 are each operable to store digitally encoded voice templates (independent of the user) of spoken utterances of selected categorical subdirectories, subsidiaries, and directory listings as detailed below. The storage units 24,26 store all of the directory categories and listings in template format and are preferably located where most convenient for data transfer with the voice server 22. The units 24,26 are preferably connected to each other and to the voice server 22 by digital communication paths such as fast-frame packet data flow.

Turning now to FIG. 2, the broad steps of a preferred method of operating a telecommunications network (e.g., the previously described network 10) for providing a voice-activated telephone directory are diagramed. The preferred method broadly includes step 34 of providing a 1-800 access number, step 36 of prompting the caller to speak a spoken category (e.g., of business entities relating to the business directory listing the caller desires to contact), step 38 of comparing the category spoken by the caller with a stored database of categories to determine a match, step 40 of prompting the caller to speak the desired business entity listing the caller is seeking if a category match is determined, step 42 comparing the entity spoken by the caller with a stored database of entities to determine a match, step 44 of connecting the caller to a business telephone number associated with the matched business entity if an entity match is determined, and step 46 of charging the business the caller was connected to a fee for making the connection.

In more detail, step 34 preferably includes the step of selecting an access number that is easily remembered by callers wishing to access the network directory and a number that is toll-free to the callers. For example, the sequence of numerals in the access number preferably correspond to letters in the traditional alpha-numeric dual tone multi frequency button setup on a conventional telephone to spell a simple neumatic. The number is preferably a number that is toll-free for the caller to dial, such as a 1-800 type telephone number. In the illustrated method, a 1-800 type number is preferred to provide a number accessible by callers regardless of nation-wide location. In addition, the access number selected is preferably heavily advertised (e.g., via national and/or local advertisements on television, radio, newspapers, etc.) to reinforce the callers' memorization of the number. In the illustrated method, the access number is 1-800-872-8728. The last seven digits of the access number correspond to the alpha-numeric telephone letters of USA-USAU so that the number can be advertised as 1-800-USA-USA-USA.

A caller can access the network 10 by simply dialing the access number from the caller's call station 12. The switch 28 is programmed to place the calling station 12 into communication with the voice server 22. Once the caller is placed in communication with the network 10, step 36 of the method is performed and a voice-prompt is activated prompting the caller to speak a category of business entities relating to the business directory listing the caller desires to contact. In particular, the voice server 22 preferably answers the call and step 36 voice prompts the caller to provide a spoken entry by saying the category of business listings the calling is seeking, the utterance of which is stored and then compared with previously stored templates of spoken categories stored in the category database storage unit 24. The templates stored in the storage unit 24 are preferably independent of the caller (e.g., templates created by speakers other than the caller). In the preferred embodiment, the category templates include primarily categories of businesses operating on a national scale such as airlines, car rental agencies, hotel chains, florists, banks, and tourism offices. However, it is within the ambit of the present invention to categorize the listings included in the directory in any suitable manner, although some form of categorization is preferred in order to reduce the search time required by the network to locate any individual listing.

Once the caller's spoken category has been stored and compared with the templates stored in the database, step 38 determines, or verifies, if the caller's spoken category matches a stored template. If a match is not detected, the network preferably activates a predetermined error subroutine. The preferred error subroutine transfers the caller to a live customer service representative, although the error subroutine could prompt the caller to speak the category again and reattempt to verify it. The customer service representative could be a local or long distance operator or a dedicated representative provided by the network directory provider.

If a category match is determined in step 38 in response to the prompt of step 36, step 40 then prompts the caller to speak the desired business entity listing the caller is seeking. Step 40 preferably utilizes the voice server 22 in a manner similar to that described above with regard to step 36. In particular, the spoken entry is preferably stored and compared with previously stored templates of spoken business entities stored in the entity database unit 26. Again, the stored entities are preferably not caller-dependant, just as with the stored categories described above. In the preferred embodiment, the stored entities are included in subdirectories corresponding with the matched category from steps 36 and 38. For example, if the matched category is airlines, a subdirectory therein includes all of the existing national airlines having business listings. It is within the ambit of the present invention to utilize further subdirectories of the categories, each having a corresponding voice prompt, such as geographic or alphabetical subdirectories. Although it is preferred to subdivide the directory into categories and corresponding subdirectories of business entities thereunder, it is also within the ambit of the present invention to allow the caller to speak directly the business entity upon accessing the network. For example, a by-pass option could be provided wherein the caller does not have to speak a category.

Once the caller's spoken entity has been stored and compared with entity templates stored in the database, step 42 determines, or verifies, if the caller's spoken entry matches a stored template. If a match is not detected, the network preferably activates the predetermined error subroutine detailed above. If an entity match is determined in step 42, step 44 retrieves the destination telephone number stored in the storage unit 26 in association with the directory listing matching the entity entry from step 40 and initiates dialing of the number. In one manner known in the art, the dialing process is initiated by retrieving the number from memory and transferring it to the switch where the call originated. It is within the ambit of the present invention to allow the caller to determine how to proceed once the listing has been located, for example allowing the caller to exit the network, with or without the number being provided, if the caller does not desire to be connected to the business call station 14. Alternatively, the caller could be prompted to select another category or entity and the program could loop back to the selected corresponding step.

If the caller is connected to the business's call station 14 in step 44, step 46 charges a fee to the selected business for the connection. Step 46 preferably stores the existence of the connection to the business along with identifying data such as date and time, so the business can be periodically billed for all connections made during the selected period. For example, step 46 could tabulate the connections made to a selected business over a predetermined period (e.g., a day, a week, a month, etc.) and the tabulation could be later regenerated and forwarded to the business (e.g., faxed, electronically mailed, etc.). In the illustrated network 10, the voice server 22 stores and tabulates the existence of connections made to each business stored in the database storage unit 26. However, it is within the ambit of the present invention to utilize the database storage units for storing billing information or to utilize a separate server for storing and/or tabulating billing information such as connections made, date, time, etc.

As previously indicated, it is within the ambit of the present invention to utilize various alternative categories, subsidiaries, and subdirectories for listings selected for inclusion in the directory. One such preferred alternative embodiment is diagramed in FIG. 3 and broadly includes step 48 of providing a 1-888 access number, step 50 of prompting the caller to speak a spoken category (e.g., of business entities relating to the business directory listing the caller desires to contact), step 52 of comparing the category spoken by the caller with a stored database of categories to determine a match, step 54 of prompting the caller to speak the desired business entity listing the caller is seeking if a category match is determined, step 56 comparing the entity spoken by the caller with a stored database of entities to determine a match, step 58 of connecting the caller to a business telephone number associated with the matched business entity if an entity match is determined, and step 60 of charging the business the caller was connected to a fee for making the connection.

The method illustrated in FIG. 3 is similar to the previously described method illustrated in FIG. 2 and similarly is for operating a telecommunications network, such as the network 10, to provide a voice-activated telephone directory. This alternative method, however, is directed to providing a directory of predominantly locally operating businesses although the access number is preferably a nation-wide number toll-free to the caller. In this regard, step 48 differs from step 34 of the previously described method in that the access number provided is preferably 1-888-872-8728. Furthermore, in step 50, once the voice server 22 answers the call and the caller provides a spoken entry by saying the category of business listings the caller is seeking, the utterance is stored and then compared with previously stored templates of spoken categories stored in the category database storage unit 24. However, the templates stored in the storage unit 24 preferably include primarily categories of businesses operating on a local scale such as restaurants, doctors, dentists, automobile dealers, plumbers, and accountants. Accordingly, the business entity templates stored in the subdirectories in the storage unit 24 for comparison as provided in steps 54 and 56 preferably include corresponding local businesses.

It will be appreciated that the local businesses contained in the database stored in storage unit 24 may be voluminous. In this regard, it is within the ambit of the present invention to utilize various steps for connecting the caller to the local business. For example, the local businesses contained in the database could be limited to pre-enrolled members that each have a 1-800 number for their local business. In this manner, the caller could be connected to the local business by transfer connect technology. However, it is also within the ambit of the present invention to include the local businesses that do not have a 1-800 number. For example, the caller could be prompted to speak a state and a city and the directory could be configured to limit the local businesses to which the caller could be connected to only the local businesses within the area code incorporating the city and state designated by the caller. However, this alternative is less preferred because of its restrictive nature.

The preferred forms of the invention described above are to be used as illustration only, and should not be utilized in a limiting sense in interpreting the scope of the present invention. Obvious modifications to the exemplary embodiments, as herein above set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A method of providing a voice-activated telephone directory comprising the steps of:

(a) advertising an easily remembered toll-free telephone number for accessing the directory;

(b) receiving a telephone call over a telecommunications network from a caller in response to the caller dialing the telephone number;

(c) activating a voice-prompt from a voice server prompting the caller to speak a spoken category, without requiring the caller to request the voice service prompting the caller to speak the spoken category;

(d) comparing the category spoken by the caller with a stored database of categories to determine a first match;

(e) activating a voice-prompt from the voice server prompting the caller to speak a spoken business identity if the first match is determined;

(f) comparing the business identity spoken by the caller with a stored subdirectory of business identities grouped to the matched category to determine a second match;

(g) connecting the caller to a business telephone number associated with the matched business identity if the second match is determined without requiring an additional input by the caller;

(h) charging the business the caller was connected to a fee for making the connection; and (i) connecting the caller to a live operator if the first or second match is not determined.

2. The method as claimed in claim 1, wherein the telephone number of step (a) is 1-800-USA-USA-U and is advertised as 1-800-USA-USA-USA.

3. The method as claimed in claim 2,
wherein the stored database categories of step (d) include airlines, car rentals, hotels, florists, banks, and tourism offices.

4. The method as claimed in claim 1,
wherein the telephone number of step (a) is 1-888-USA-USA-U and is advertised as 1-888-USA-USA-USA.

5. The method as claimed in claim 4,
wherein the stored database categories of step (d) include restaurants, doctors, dentists, automobile dealers, plumbers, and accountants.

6. A voice-activated telephone directory comprising:
a first database including a plurality of business identities wherein each identity is associated with a business telephone number;
a second database including a plurality of business categories wherein each category is associated with at least a portion of the plurality of business identities and the association is not effected by a caller's use of the directory;
a voice server activated by the caller dialing a toll-free access number,
said voice server being operable to receive a first spoken entry from the caller and compare said first entry with said plurality of business categories in the second database to determine a first match,
said voice server being operable to prompt the caller to speak a second spoken entry if the first match is determined, receive the second entry, and compare said second entry with said plurality of business identities in the first database to determine a second match,
if said second match is determined, said voce server being operable to connect the caller to the business telephone number associated with the business identity matching the second spoken entry; and
a billing server operable to tabulate the total connections made by the voice server to each business telephone number associated with each business identity in the first database.

7. The directory as claimed in claim 6,
said business categories including airlines, car rentals, hotels, florists, banks, and tourism offices.

8. The directory as claimed in claim 7, said toll-free access number being 1-800-USA-USAU.

9. The directory as claimed in claim 6,
said business categories including restaurants, doctors, dentists, automobile dealers, plumbers, and accountants.

10. The directory as claimed in claim 9, said toll-free access number being 1-888-USA-USAU.

11. The directory as claimed in claim 6,
said voice server being operable to connect the caller to an operator if the first or second match is not determined.

12. A method of providing a voice-activated telephone directory comprising the steps of:
(a) advertising an easily remembered toll-free telephone number for accessing the directory;
(b) receiving a telephone call over a telecommunications network from a caller in response to the caller dialing the telephone number;
(c) activating a voice-prompt from a voice server, without any input from the caller, prompting the caller to speak a spoken category;
(d) comparing the category spoken by the caller with a stored database of categories to determine a first match;
(e) activating a voice-prompt from the voice server prompting the caller to speak a spoken business identity if the first match is determined;
(f) comparing the business identity spoken by the caller with a stored subdirectory of business identities grouped to the matched category to determine a second match;
(g) connecting the caller automatically and without caller input to a business telephone number associated with the matched business identity if the second match is determined;
(h) charging the business the caller was connected to a fee for making the connection; and
(i) connecting the caller to a live operator if the first or second match is not determined.

13. A voice-activated telephone directory comprising:
a first database including a plurality of business identities wherein each identity is associated with a business telephone number;
a second database including a plurality of business categories wherein each category is associated with at least a portion of the plurality of business identities and the association is not effected by a caller's use of the directory;
a voice server activated by the caller dialing a toll-free access number;
said voice server being operable to receive a first spoken entry from the caller and compare said first entry with said plurality of business categories in the second database to determine a first match, wherein the first spoken entry comprises a business category;
said voice server being operable to prompt the caller to speak a second spoken entry if the first match is determined, receive the second entry, and compare said second entry with said plurality of business identities in the first database to determine a second match, wherein the second spoken entry is a business identity and the plurality of business identities in the first database are included in subdirectories corresponding with the second match;
if said second match is determined, said voice server being operable to automatically connect the caller to the business telephone number associated with the business identity matching the second spoken entry, such that the caller is not required to request that the connection be established;
said voice server being operable to connect the caller to a live operator if the first match or second match cannot be determined; and
a billing server operable to tabulate the total connections made by the voice server to each business telephone number associated with each business identity in the first database.

* * * * *